(12) United States Patent
Kawahara (10) Patent No.: US 7,480,873 B2
(45) Date of Patent: Jan. 20, 2009

(54) METHOD AND APPARATUS FOR MANIPULATING TWO-DIMENSIONAL WINDOWS WITHIN A THREE-DIMENSIONAL DISPLAY MODEL

(75) Inventor: Hideya Kawahara, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 913 days.

(21) Appl. No.: 10/663,609

(22) Filed: Sep. 15, 2003

(65) Prior Publication Data

US 2005/0057497 A1    Mar. 17, 2005

(51) Int. Cl.
*G06F 3/048* (2006.01)
(52) U.S. Cl. .................. 715/848; 715/850; 715/782
(58) Field of Classification Search .......... 715/848, 715/850, 856, 782
See application file for complete search history.

(56) References Cited

U.S. PATENT DOCUMENTS

| | | | | |
|---|---|---|---|---|
| 5,515,486 A * | 5/1996 | Amro et al. | ............... | 715/848 |
| 5,601,432 A | 2/1997 | Bergman | ............... | 434/118 |
| 5,621,906 A * | 4/1997 | O'Neill et al. | ............... | 715/848 |
| 5,678,015 A * | 10/1997 | Goh | ............... | 715/782 |
| 5,689,286 A | 11/1997 | Wugofski | ............... | 345/348 |
| 5,724,492 A * | 3/1998 | Matthews et al. | ............... | 345/419 |
| 5,774,125 A * | 6/1998 | Suzuoki et al. | ............... | 345/582 |
| 5,831,617 A | 11/1998 | Bhukhanwala | ............... | 345/349 |
| 5,880,733 A * | 3/1999 | Horvitz et al. | ............... | 715/850 |
| 5,898,433 A * | 4/1999 | Hijikata | ............... | 715/782 |
| 5,929,853 A * | 7/1999 | Guha | ............... | 715/764 |
| 6,229,542 B1 * | 5/2001 | Miller | ............... | 715/782 |
| 6,326,978 B1 * | 12/2001 | Robbins | ............... | 345/654 |
| 6,344,863 B1 * | 2/2002 | Capelli et al. | ............... | 715/781 |
| 6,597,358 B2 * | 7/2003 | Miller | ............... | 345/427 |
| 6,661,426 B1 * | 12/2003 | Jetha et al. | ............... | 345/629 |
| 6,822,662 B1 * | 11/2004 | Cook et al. | ............... | 715/788 |
| 6,874,123 B1 * | 3/2005 | DeStefano | ............... | 715/526 |
| 7,003,737 B2 * | 2/2006 | Chiu et al. | ............... | 715/848 |
| 7,042,449 B2 * | 5/2006 | Khan | ............... | 345/420 |
| 7,043,701 B2 * | 5/2006 | Gordon | ............... | 715/848 |
| 7,069,516 B2 * | 6/2006 | Rekimoto | ............... | 715/757 |

(Continued)

FOREIGN PATENT DOCUMENTS

WO    WO 00/60442    10/2000

(Continued)

*Primary Examiner*—Kieu D Vu
*Assistant Examiner*—David Phantana-angkool
(74) *Attorney, Agent, or Firm*—Park, Vaughan & Fleming LLP (57) ABSTRACT

One embodiment of the present invention provides a system that facilitates manipulating a 2D window within a three-dimensional (3D) display model. During operation, the system receives an input from a 2D pointing device, wherein the input specifies a 2D offset within a 2D display, and wherein the 2D display provides a view into the 3D display model. Next, the system uses the 2D offset to move a cursor to a position in the 2D display, and then determines if the cursor overlaps a window within the 3D display model. If so, the system determines a 2D position of the cursor with respect to a 2D coordinate system for the window, and communicates this 2D position to an application associated with the window. This enables a user of the 2D pointing device to interact with the application.

31 Claims, 9 Drawing Sheets

U.S. PATENT DOCUMENTS

| | | | |
|---|---|---|---|
| 7,170,510 B2 * | 1/2007 | Kawahara et al. | 345/419 |
| 7,245,310 B2 * | 7/2007 | Kawahara et al. | 715/782 |
| 7,263,667 B1 * | 8/2007 | Hoellerer et al. | 715/782 |
| 2001/0040571 A1 | 11/2001 | Miller | 345/419 |
| 2002/0113820 A1 | 8/2002 | Robinson et al. | 345/764 |
| 2004/0090467 A1 | 5/2004 | Bonura et al. | 345/790 |

FOREIGN PATENT DOCUMENTS

| | | |
|---|---|---|
| WO | 02/33568 | 4/2002 |
| WO | WO 02/29760 | 4/2002 |
| WO | 04/044727 | 5/2004 |

* cited by examiner

METHOD AND APPARATUS FOR MANIPULATING TWO-DIMENSIONAL WINDOWS WITHIN A THREE-DIMENSIONAL DISPLAY MODEL

RELATED APPLICATION

The subject matter of this application is related to the subject matter in a co-pending non-provisional application entitled, "Enhancements for Manipulating Two-Dimensional Windows Within a Three-Dimensional Display Model," by inventors Hideya Kawahara, Curtis J. Sasaki, Daniel J. Baigent and Yasuyo Okuda having Ser. No. 10/663,640, and filing date 15 Sep. 2005.

BACKGROUND

1. Field of the Invention

The present invention relates to user interfaces for computer systems. More specifically, the present invention relates to a method and an apparatus that facilitates manipulating two-dimensional windows that are mapped into a three-dimensional display model.

2. Related Art

Today, most personal computers and other high-end devices support window-based graphical user interfaces (GUIs), which were originally developed back in the 1970's. These window-based interfaces allow a user to manipulate windows through a pointing device (such as a mouse), in much the same way that pages can be manipulated on a desktop. However, because of limitations on graphical processing power at the time windows were being developed, many of the design decisions for windows were made with computational efficiency in mind. In particular, window-based systems provide a very flat (two-dimensional) 2D user experience, and windows are typically manipulated using operations that keep modifications of display pixels to a minimum. Even today's desktop environments like Microsoft Windows (distributed by the Microsoft Corporation of Redmond, Wash.) include vestiges of design decisions made back then.

In recent years, because of increasing computational requirements of 3D applications, especially 3D games, the graphical processing power of personal computers and other high-end devices has increased dramatically. For example, a middle range PC graphics card, the "GeForce2 GTS" distributed by the NVIDIA Corporation of Sunnyvale, Calif., provides a 3D rendering speed of 25 million polygon-per-second, and Microsoft's "Xbox" game console provides 125 million polygon-per-second. These numbers are significantly better than those of high-end graphics workstation in the early 1990's, which cost tens of thousands (and even hundreds of thousands) of dollars.

As graphical processing power has increased in recent years, a number of 3D user interfaces have been developed. These 3D interfaces typically allow a user to navigate through and manipulate 3D objects. However, these 3D interfaces are mainly focused on exploiting 3D capabilities, while little attention has been given to supporting existing, legacy window-based 2D applications within these 3D user interfaces.

Hence, what needed is a method and an apparatus that supports legacy 2D window-based applications within a 3D user interface.

SUMMARY

One embodiment of the present invention provides a system that facilitates manipulating a 2D window within a three-dimensional (3D) display model. During operation, the system receives an input from a 2D pointing device, wherein the input specifies a 2D offset within a 2D display, and wherein the 2D display provides a view into the 3D display model. Next, the system uses the 2D offset to move a cursor to a position in the 2D display, and then determines if the cursor overlaps a window within the 3D display model. If so, the system determines a 2D position of the cursor with respect to a 2D coordinate system for the window, and communicates this 2D position to an application associated with the window. This enables a user of the 2D pointing device to interact with the application.

In a variation on this embodiment, determining if the cursor overlaps a window within the 3D display model involves projecting a ray from a predefined viewpoint in the 3D display model through the cursor, which is located in a rectangle representing the 2D display in the 3D display model, toward one or more windows in the 3D display model, and then determining if the ray intersects a window.

In a further variation, determining the 2D position of the cursor with respect to the 2D coordinate system of the window involves first determining a 3D position where the ray intersects the window within the 3D display model, and then transforming the 3D position into a 2D position with respect to the 2D coordinate system for the window based upon the size, position and orientation of the window within the 3D display model.

In a further variation, the size, position and orientation of the window within the 3D display model are specified by a number of attributes of the window, including: a height, a width, an x-position, a y-position, a z-position, a first rotation around a vertical axis of the window, and a second rotation around a horizontal axis of the window.

In a variation on this embodiment, in response to another input from the 2D pointing device, the system changes a viewing angle for the 3D display model by rotating objects within the 3D display model around a predefined viewpoint.

In a variation on this embodiment, if the cursor overlaps a given window, the given window becomes a selected window and appears opaque while other windows within the 3D display model appear translucent.

In a variation on this embodiment, if a command is received to minimize a window, the window minimization operation is illustrated as an animation that moves the window toward a minimized position near a border of the 2D display while reducing the size of the window to its minimized size.

In a variation on this embodiment, if a command is received to close a window, the window closing operation is illustrated as an animation that throws the window away by moving the window toward the background of the 3D display model and causing the window to fade away.

In a variation on this embodiment, if a command is received to rotate all windows in the 3D display model, the system rotates all windows in the 3D display model, so that windows are viewed from an oblique angle through the 2D display, whereby the contents of the windows remain visible, while the windows occupy less space in the 2D display and are less likely to overlap each other.

In a further variation, when a window is rotated, a spine located on a side edge of the window becomes visible, wherein the spine contains identification information for the window.

In a further variation, when a user selects one of the rotated windows, the system moves the selected window in front of the other windows. The system also unrotates the selected window so it faces the user, and moves the other windows back to their original positions and orientations.

In a variation on this embodiment, the 2D pointing device can include: a mouse, a track ball, a joystick, or a glide point.

One embodiment of the present invention provides a system that facilitates manipulating a window within a three-dimensional (3D) display model, wherein the window provides a 2D user interface for a 2D application. During operation, the system displays a view into the 3D display model through a two-dimensional (2D) display. Upon receiving a command to manipulate the window within the 3D display model, the system manipulates the window within the 3D display model so that the manipulation is visible within the 2D display.

In a variation on this embodiment, if the command moves the window in close proximity to an edge of the 2D display, the system tilts the window so that the window appears at an oblique angle in the 2D display, whereby the contents of the window remain visible, while the window occupies less space in the 2D display and is less likely to overlap other windows.

In a variation on this embodiment, determining the 2D position of the cursor with respect to the 2D coordinate system of the window involves determining a 3D position where the ray intersects the window within the 3D display model. It also involves transforming the 3D position in the 3D display model into a corresponding 2D position with respect to the 2D coordinate system for the window based upon the size, position and orientation of the window within the 3D display model.

In a variation on this embodiment, if the command rotates the window so that the backside of the window is visible, the system displays information associated with the 2D application on the backside of the window. This information can include: application version information, application settings, application parameters, application properties, and notes associated with a file or a web page that is displayed in the window. In a further variation, the backside of the window can accept user input, including change settings, parameters, properties and/or notes.

In a variation on this embodiment, if the command is to minimize the window, manipulating the window involves: tilting the window so that a spine located on a side edge of the window is visible and the contents of the window remains visible, wherein the spine contains identification information for the window. It also involves moving the minimized window to an edge of the 2D display, wherein the operations of turning and moving the window are animated as a continuous motion.

In a variation on this embodiment, upon receiving a predefined gesture through a pointing device, the system minimizes a top-level window in the 2D display, whereby repeating the predefined gesture causes subsequent top-level windows to be minimized.

In a further variation, upon receiving a window restoration command, the system restores minimized windows to their expanded state.

In a variation on this embodiment, if the command is entered through a pointing device and the command throws the window by moving the window quickly and releasing it, the system "throws" the window by moving the window in a continuous animated motion, which moves the window into the background of the 3D display model or minimizes the window.

In a variation on this embodiment, receiving the command can involve: rotating the window so that window controls on the edge of the window become visible in response to a cursor moving close to an edge of a window; receiving the command through a window control; and then rotating the window back to its original orientation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

3D Display Model

Figure 1:
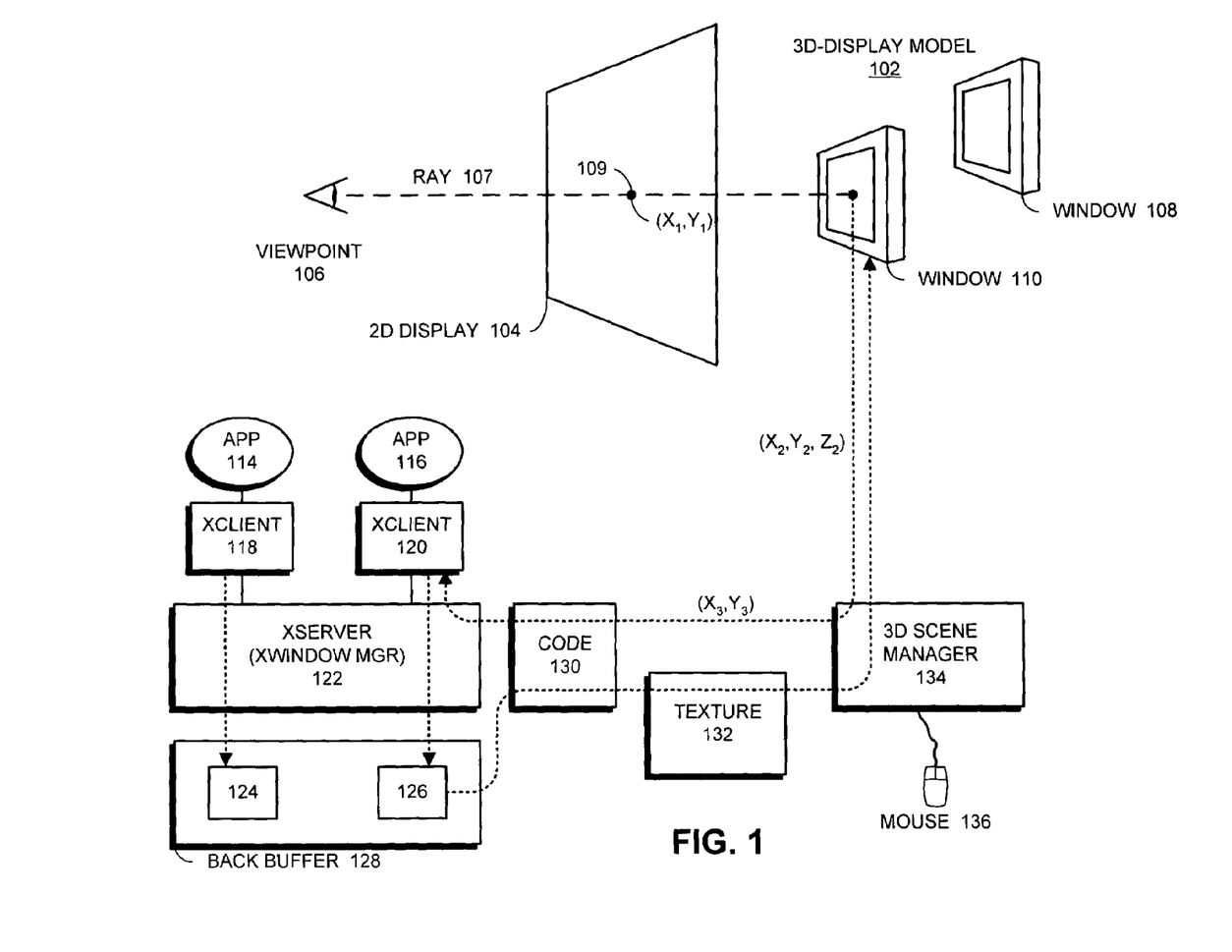
FIG. 1 illustrates a 3D display model with supporting components in accordance with an embodiment of the present invention.
Figure 3:
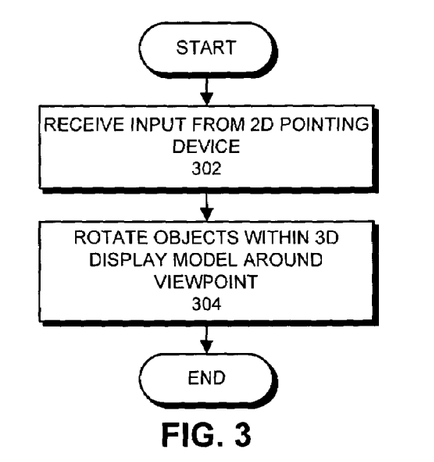
FIG. 3 presents a flow chart illustrating how input from a pointing device causes objects to rotate around a viewpoint in the 3D display model in accordance with an embodiment of the present invention.

FIG. 1 illustrates 3D display model 102 with supporting components in accordance with an embodiment of the present invention. More specifically, the top portion of FIG. 3 illustrates 3D display model 102, which includes a number of 3D objects including window 110 and window 112. Note that windows 108 and 110 are actually 3D objects which represent 2D windows. Hence, windows 108 and 110 can be moved and rotated within 3D display model 102, while they provide a 2D output and receive input for associated 2D applications. 3D display model 102 can additionally include a background (which is not shown).

Windows 108 and 110 can be associated with a number of window attributes. For example, window 110 can include x, y, and z position attributes that specify the 3D position of the center of window 110 within 3D display model 102, as well as a rotation attributes that specify rotations of window 110 around horizontal and vertical axes. Window 110 can also be associated with scaling factor, translucency and shape attributes.

3D objects within 3D display model 102 are viewed from a viewpoint 106 through a 2D display 104, which is represented by a 2D rectangle within 3D display model 102. During the rendering process, various well-known techniques, such as ray tracing, are used to map objects from 3D display model 102 into corresponding locations in 2D display 104.

The bottom portion of FIG. 1 illustrates some of the system components that make it possible to map 2D windows into 3D display model 102 in accordance with an embodiment of the present invention. Referring to FIG. 1, applications 114 and 116 are associated with windows 108 and 110, respectively. A number of components are involved in facilitating this association. In particular, applications 114 and 116 are associated with xclients 118 and 120, respectively. Xclients 118 and 120 in turn interact with xserver 122, which includes an associated xwindow manager. These components work together to render output bitmaps 124 and 126 for applications 114 and 116 to be displayed in windows 108 and 110, respectively. These bitmaps 124 and 126 are maintained within back buffer 128.

Code module 130 causes bitmaps 124 and 126 to be displayed on corresponding windows 108 and 110. More specifically, code module 130 retrieves bitmap 126 and coverts it into a texture 132, which is displayed on the front face of window 110. This is accomplished though interactions with 3D scene manager 134. Bitmap 124 is similarly mapped into window 108.

Figure 2:
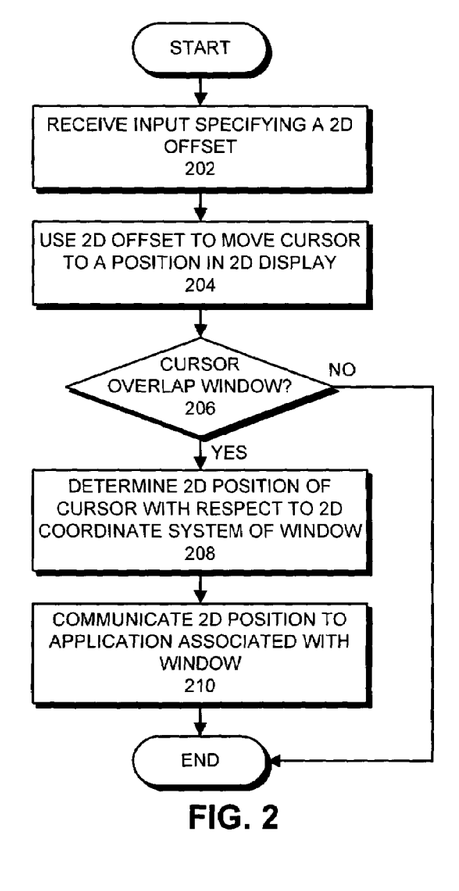
FIG. 2 presents a flow chart illustrating how input from a pointing device is communicated to an application associated with a window in a 3D display model in accordance with an embodiment of the present invention.

3D scene manager 134 can also received input from a 2D pointing device, such as mouse 136, and can communicate this input to applications 114 and 116 in the following way. 3D scene manger 134 first receives an input specifying a 2D offset from mouse 136 (step 202). Next, the system uses this 2D offset to move a cursor 109 to a new position $(x_1,y_1)$ in 2D display 104 (step 204).

The system then determines if cursor 109 overlaps a window in 3D display model 102 (step 206). This can be accomplished by projecting a ray 107 from viewpoint 106 through cursor 109 and then determining if the ray intersects a window. If there is no overlap, the process is complete.

Otherwise, if there is overlap, the system uses the 3D position $(X_2,y_2,z_2)$ within display model 102 where ray 107 intersects window 110, as well as attributes of window 110, such as position and rotation attributes, to determine the 2D position $(x_3,y_3)$ of this intersection with respect to a 2D coordinate system of window 110 (step 208). The system then communicates this 2D position $(x_3,y_3)$ to application 116, which is associated with window 110 (step 210).

Various user inputs, for example through mouse 136 or a keyboard, can be used to manipulate windows within 3D display model 102. Some of these manipulations are described below.

Rotation Around Viewpoint

FIG. 3 presents a flow chart illustrating how input from a pointing device causes objects to rotate around a viewpoint 106 in 3D display model 102 in accordance with an embodiment of the present invention. First, the system receives an input from a 2D pointing device indicating that a rotation is desired (step 302). For example, the system can receive a movement input from mouse 136. In response to this input, the system can rotate objects within the 3D display model around viewpoint 106, or alternatively around another point within 3D display model 102 (step 304). This rotational motion makes it easier for a user to identify window boundaries and also gives the user a feeling of depth and space.

Rotating Windows

Figure 4A:
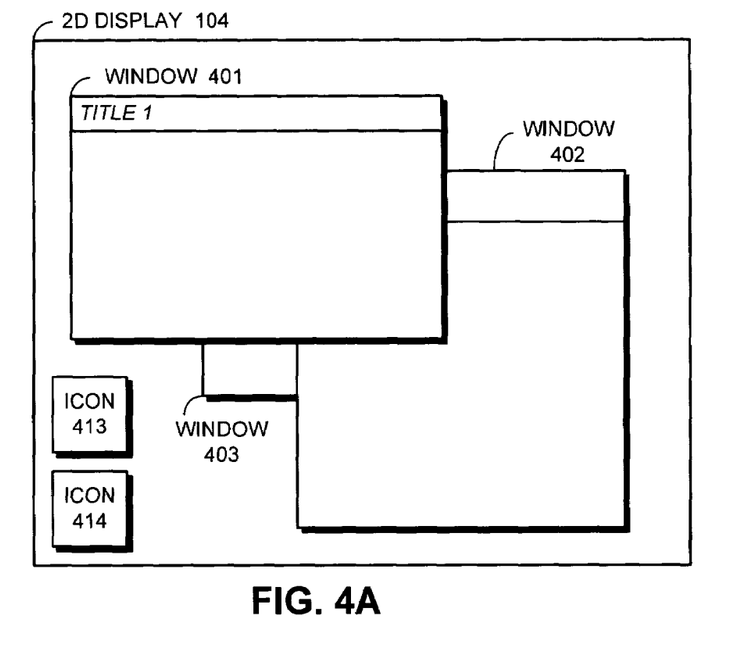
FIG. 4A illustrates an exemplary set of windows in the 3D display model in accordance with an embodiment of the present invention.

FIG. 4A illustrates an exemplary set of windows in 3D display model 102 in accordance with an embodiment of the present invention. This exemplary set of windows includes windows 401-404. In FIG. 4A, window 403 is partly obscured, and window 404 is completely obscured, by windows 401-402. Windows 401-404 are additionally associated with icons 411-414, respectively. However, icons 411-412 are not visible in FIG. 4A because they are obscured by window 401.

Figure 4B:
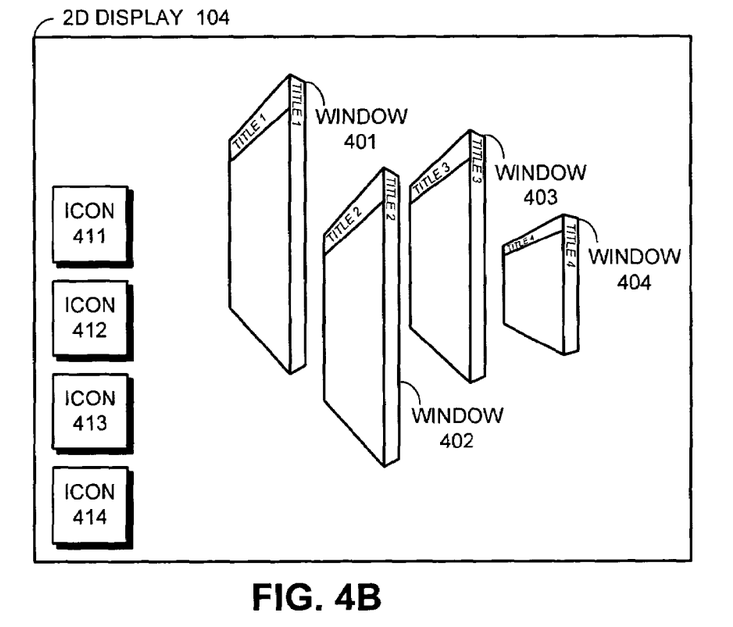
FIG. 4B illustrates how windows are rotated in accordance with an embodiment of the present invention.

FIG. 4B illustrates how windows 401-404 are rotated in accordance with an embodiment of the present invention. In FIG. 4B, windows 401-404 are rotated so that they appear at an oblique angle, wherein the contents of the windows remain visible, while the windows occupy less space and are less likely to overlap each other. Note that windows 403 and 404 are now completely visible and icons 411 and 412 are no longer obscured. Also note that titles containing descriptive information appear on spines located on the edges of the windows 401-404.

Figure 4C:
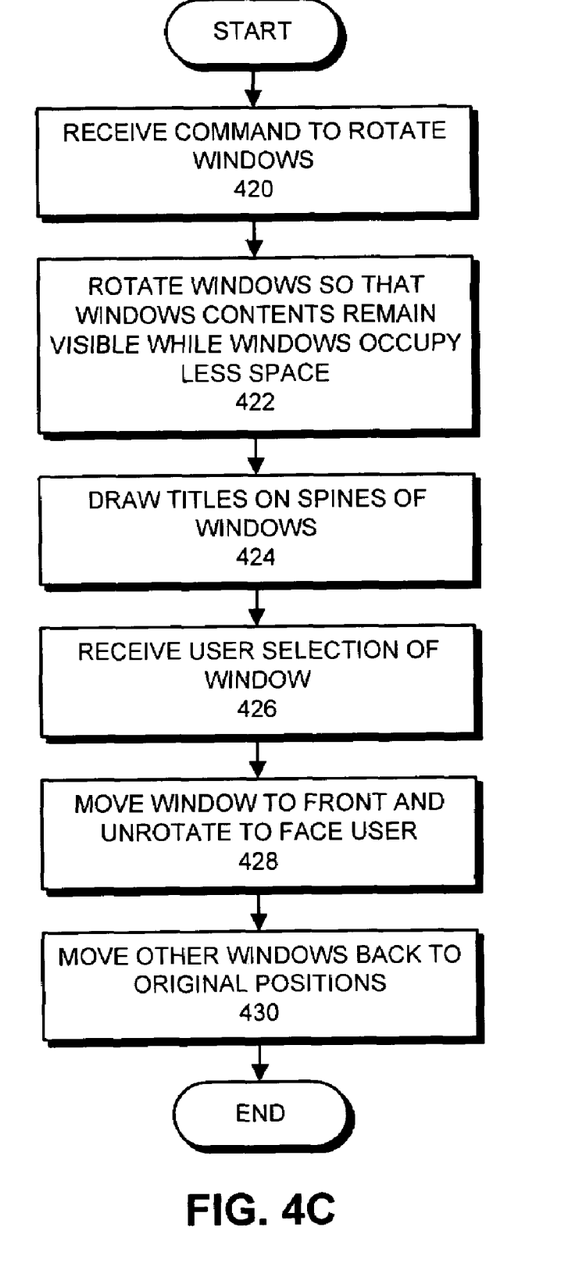
FIG. 4C presents a flow chart of the process of rotating windows in accordance with an embodiment of the present invention.

FIG. 4C presents a flow chart of the process of rotating windows in accordance with an embodiment of the present invention. First, the system receives a pre-specified command to rotate all of the windows. This command can be received from the pointing device, a keyboard, or some other input device (step 420). In response to this command, the system rotates windows 401-404 to an oblique angle so that the contents of the windows remain visible, while the windows occupy less space (step 422). The system also draws titles on spines of the windows (step 424).

Next, the system can receive a user selection of a window. For example, when the user moves cursor 109 over window 401, window 401 is selected (step 426). In response to this user selection, the system moves the selected window in front of all other windows in 3D display model 102 and unrotates the selected window so that it faces the user (step 428). The system also moves other windows back to their original unrotated positions. In one embodiment of the present invention, the selected window appears opaque, while other windows appear translucent.

Minimizing Windows

Figure 5A:
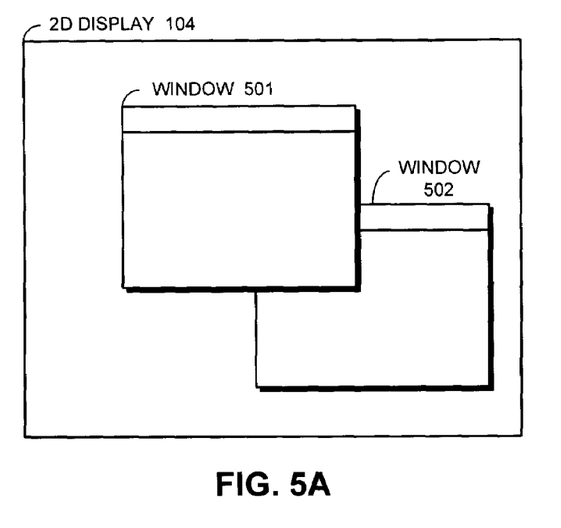
FIG. 5A illustrates an exemplary window in the 3D display model in accordance with an embodiment of the present invention.
Figure 5B:
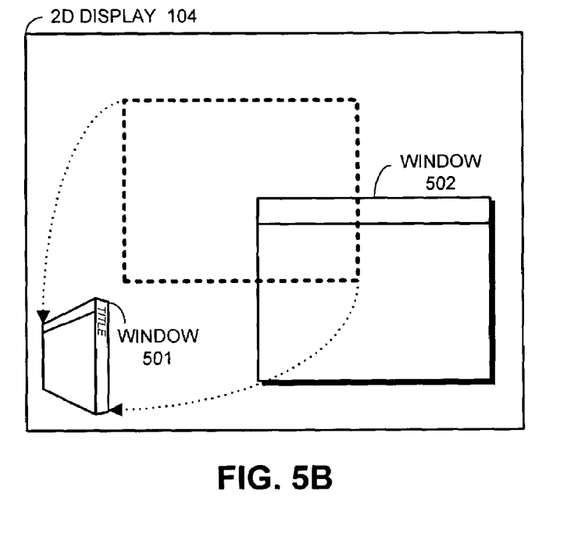
FIG. 5B illustrates how the exemplary window is minimized in accordance with an embodiment of the present invention.

FIG. 5A illustrates exemplary windows 501-502 in the 3D display model 102, and FIG. 5B illustrates how window 501 is minimized in accordance with an embodiment of the present invention. Referring to the flow chart in FIG. 5C, the system first receives a command to minimize window 501 (step 510). For example, mouse 136 can be used to select a minimization button on window 501. In response to this minimization command, window 501 is tilted (and possibly reduced in size) so that the contents of window 501 remain visible, while window 501 occupies less space (step 512). Tilting window 501 also causes a title on the spine of window 501 to become visible. At the same time, window 501 is moved toward an edge of the display (step 514).

Figure 5C:
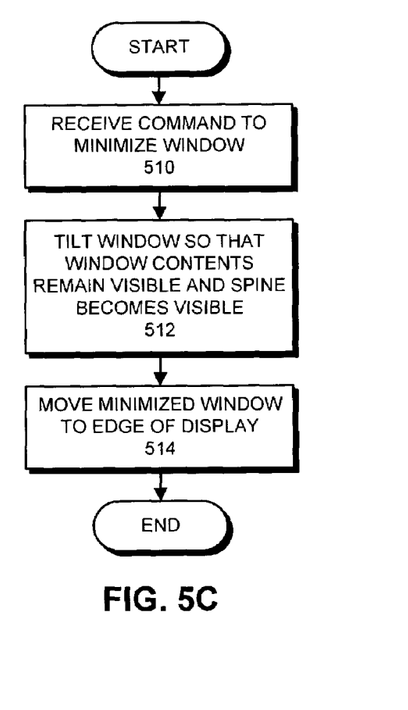
FIG. 5C presents a flow chart of the process of minimizing a window in accordance with an embodiment of the present invention.

These operations take place through a continuous animation that starts with the original unminimized window and ends with the minimized window. This can be accomplished by incrementally changing window parameters, such as position, rotation and scaling factor parameters. In this way, the user is better able to associate the minimized window with the original window.

Once window 501 is minimized, another command from the user can cause the window to be maximized so that the window can be more easily viewed and so that the window can receive an input.

Tilting Windows

Figure 6A:
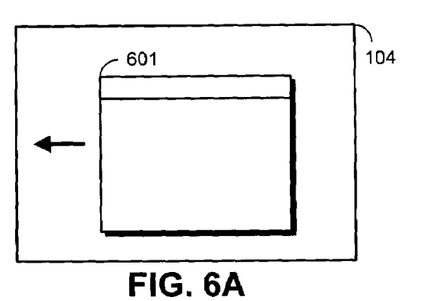
FIG. 6A illustrates an exemplary window in the 3D display model in accordance with an embodiment of the present invention.
Figure 6B:
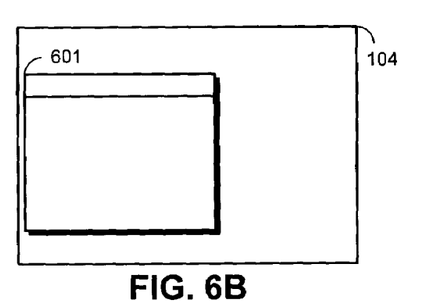
FIG. 6B illustrates how a window is moved toward the edge of the display in accordance with an embodiment of the present invention.
Figure 6C:
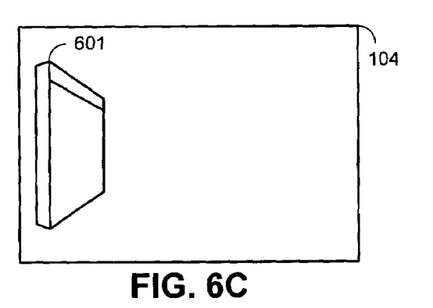
FIG. 6C illustrates how a window is tilted in accordance with an embodiment of the present invention.
Figure 6D:
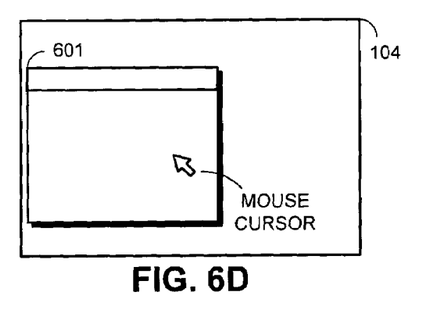
FIG. 6D illustrates how a window is untilted in accordance with an embodiment of the present invention.
Figure 6E:
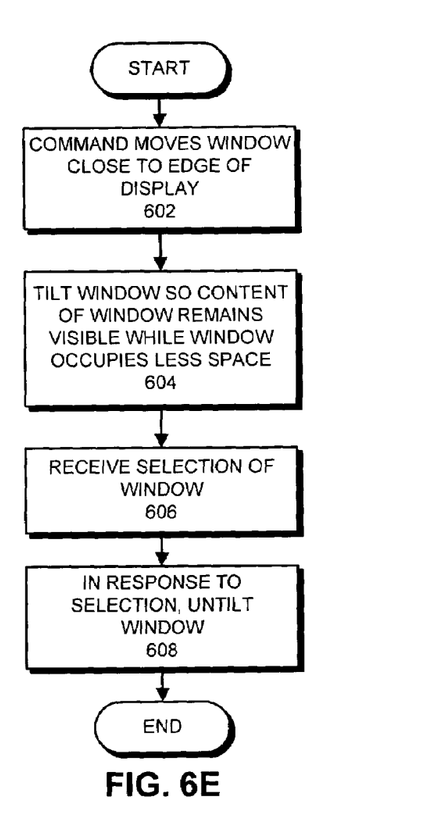
FIG. 6E presents a flow chart of the process of minimizing windows in accordance with an embodiment of the present invention.

FIG. 6A illustrates an exemplary window in 601 in 3D display model 102, and FIGS. 6B-6D illustrates how window 601 is tilted when it is moved toward the edge of 2D display 104 in accordance with an embodiment of the present invention. Referring the flowchart in FIG. 6A, the system first receives a command to move the window to the edge of the display (step 602). For example, the user can use a pointing device to move window 601 so that it is near the edge of 2D display 104 (see FIG. 6B). When window 601 is moved near the edge of 2D display 104, the system tilts window 601, so that the contents of window 601 remain visible, while window 601 occupies less space and is less likely to overlap other windows (step 604 see FIG. 6C).

Next, the system can receive a selection of window 601 by a user. For example, the user may move cursor 109 near window 601 (step 606). In response to this user selection, the system can untilt the window 601 so that the user can see it better and can enter commands into the window (step 608, see FIG. 6D).

Displaying Application Information on Back of Window

Figure 7A:
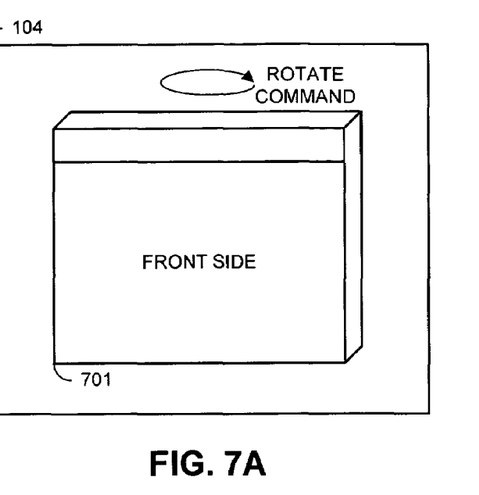
FIG. 7A illustrates an exemplary window in the 3D display model in accordance with an embodiment of the present invention.
Figure 7B:
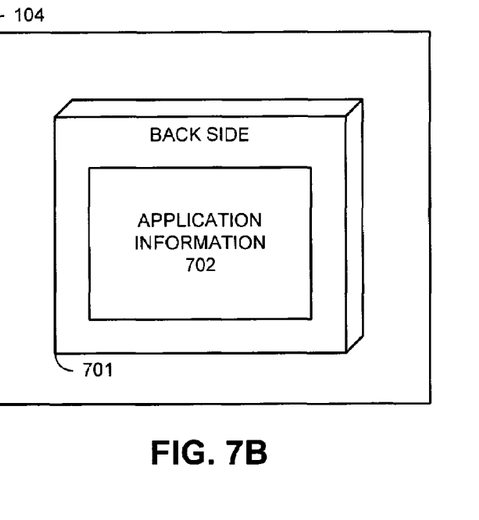
FIG. 7B illustrates how the exemplary window is rotated to display application information on the backside of the window in accordance with an embodiment of the present invention.
Figure 7C:
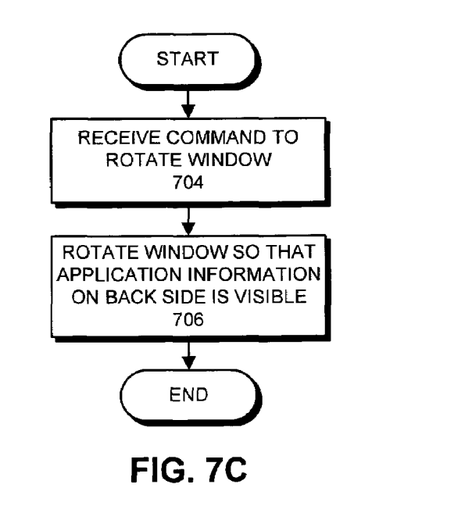
FIG. 7C presents a flow chart of the process of rotating a window in accordance with an embodiment of the present invention.

FIG. 7A illustrates an exemplary window 701 in 3D display model 102, and FIG. 7B illustrates how window 701 is rotated to display application information on the backside of window 701 in accordance with an embodiment of the present invention. Referring to the flow chart in FIG. 7C, the system first receives a command (possibly through a mouse or a keyboard) to rotate window 701 (step 704). In response to this command, the system rotates window 701 so that application information 702 on the backside of window 701 becomes visible (step 706). This application information can include application version information, application settings, application parameters, and application properties. It can also include notes associated with a file or a web page that is displayed in the window. In one embodiment of the present invention, the system allows the user to modify application information 702 on the backside of window 701. This enables the user to change application parameters, if necessary.

Using Window Controls on Side of Window

Figure 8A:
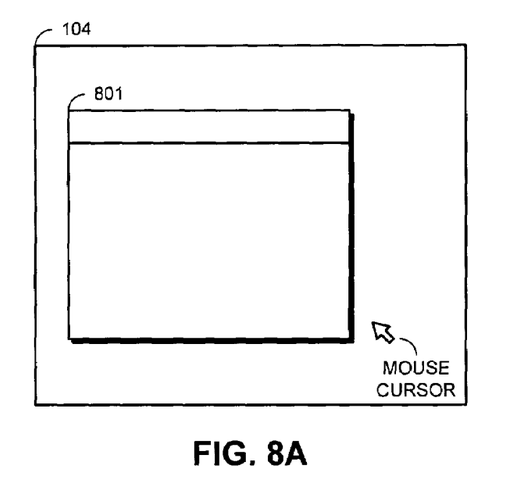
FIG. 8A illustrates an exemplary window in the 3D display model in accordance with an embodiment of the present invention.
Figure 8B:
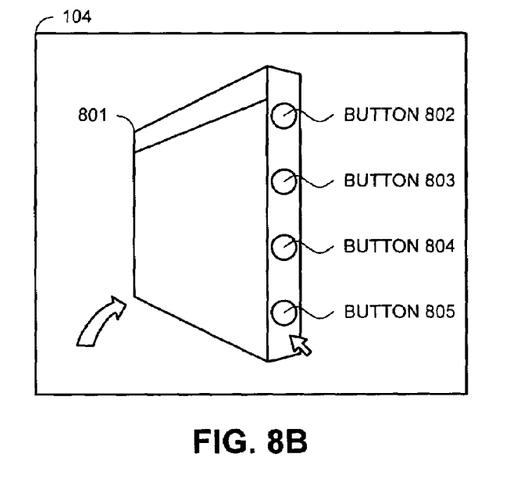
FIG. 8B illustrates how the exemplary window is rotated to reveal window controls on the edge of the window in accordance with an embodiment of the present invention.
Figure 8C:
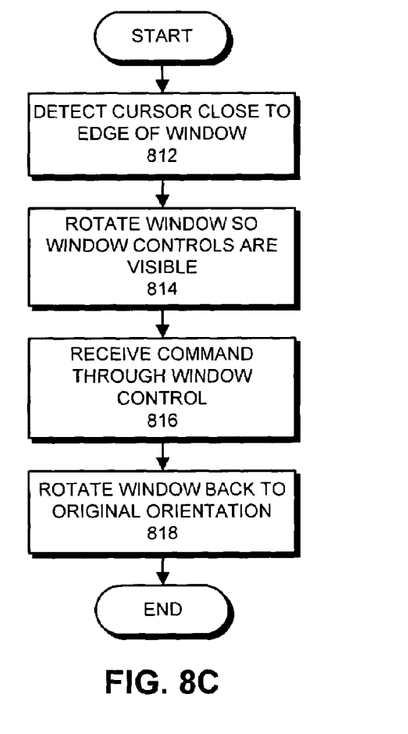
FIG. 8C presents a flow chart of the process of rotating a window to reveal window controls in accordance with an embodiment of the present invention.

FIG. 8A illustrates an exemplary window 801 in 3D display model 102, and FIG. 8B illustrates how window 801 is rotated to reveal window controls on the edge of the window in accordance with an embodiment of the present invention. Referring to the flow chart illustrated in FIG. 8C, the system first detects a cursor close to the edge of window 801 (step 812). In response to detecting the cursor, the system rotates the window so that window controls on the edge of window 801 are visible (step 814). For example, in FIG. 8B buttons 802-805 become visible. Note that in general other types of controls, such as pull-down menus, can be located on the edge of window 801. After the user enters a command into a window control (step 816), or after the user moves cursor 109 away from window 801, the system rotates window 801 back to its original orientation (step 818).

Minimizing Top-Level Windows

Figure 9:
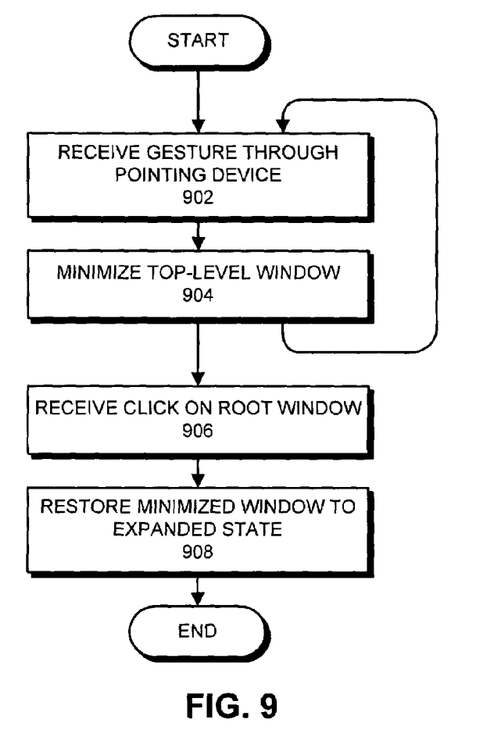
FIG. 9 presents a flow chart of the process of minimizing a top-level window in response to a gesture entered into a pointing device in accordance with an embodiment of the present invention.

FIG. 9 presents a flow chart illustrating the process of minimizing a top-level window in response to a gesture inputted through a pointing device in accordance with an embodiment of the present invention. The system first receives a pre-defined gesture through a pointing device, such as mouse 136 (step 902). For example, the gesture can be a waving motion that causes cursor 109 to move in a specific pattern across 2D display 104. In response to this gesture, the system minimizes the top-level window (step 904). As is indicated by the looping arrow in FIG. 9, repeating the predefined gesture causes subsequent top-level windows to be minimized.

Next, upon receiving a window restoration command, such as a click on a special button on a root window (step 906), the system restores all minimized windows to their expanded state (step 908).

Throwing a Window

Figure 10:
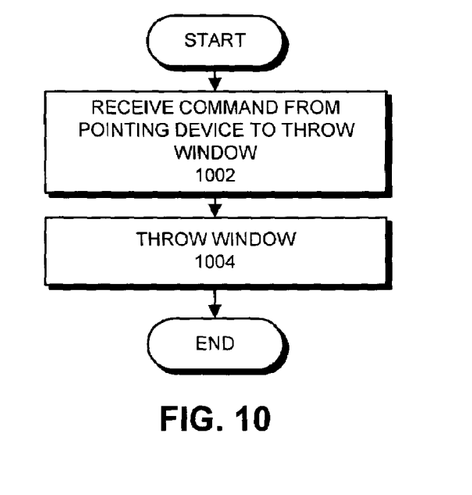
FIG. 10 presents a flow chart of the process of throwing a window in accordance with an embodiment of the present invention.

Referring to FIG. 10, in one embodiment of the present invention, if a command is entered through a pointing device and the command throws the window by moving the window quickly and releasing it (step 1002), the system "throws" the window by moving the window in a continuous animated motion, which results in a combination of one or more of the following operations: locating the window farther from the viewpoint; scaling down the size of the window; iconizing the window; and deleting the window (step 1004). Note that the term "iconizing" implies that execution of the associated application is stopped, whereas the term "scaling down" implies that the associated application remains running, while the associated window is made smaller in size.

Note that the window can be, moved, scaled, iconized and/or deleted based upon the velocity of the throw. For example, a high-velocity throw that arises from a fast mouse motion can cause the window to be deleted, whereas a lower-velocity throw that arises from a slower mouse motion can cause the window to be minimized. The distance of the move and/or factor of scaling down can also be determined based on the velocity of the throw.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for manipulating a window within a three-dimensional (3D) display model, comprising:
   receiving an input from a 2D pointing device, wherein the input specifies a 2D offset within a 2D display, wherein the 2D display provides a view into the 3D display model;
   using the 2D offset to move a cursor to a position in the 2D display;
   determining if the cursor overlaps a window within the 3D display model by projecting a ray from a predefined viewpoint in the 3D display model through the cursor, which is located in a rectangle representing the 2D display in the 3D display model, toward one or more windows in the 3D display model and determining if the ray intersects a window;
   if the cursor overlaps a window,
      determining a 2D position of the cursor with respect to a 2D coordinate system for the window, and
      communicating the 2D position to an application associated with the window to enable a user of the 2D pointing device to interact with the application; and
   displaying the window as a 3D object; wherein when the window is rotated, a spine located on a side edge of the window becomes visible, wherein the spine contains a title for the same window, and wherein the thickness of the spine is significantly less than the dimension of the window.

2. The method of claim 1, wherein determining the 2D position of the cursor with respect to the 2D coordinate system of the window involves:
   determining a 3D position where the ray intersects the window within the 3D display model; and
   transforming the 3D position in the 3D display model into a 2D position with respect to the 2D coordinate system for the window based upon the size, position and orientation of the window within the 3D display model.

3. The method of claim 2, wherein the size, position and orientation of the window within the 3D display model are specified by a number of attributes of the window, including:
   a height;
   a width;
   an x-position;
   a y-position;
   a z-position;
   a first rotation around a vertical axis of the window; and
   a second rotation around a horizontal axis of the window.

4. The method of claim 1, further comprising: receiving a second input from the 2D pointing device; and in response to the second input, changing a viewing angle for the 3D display model by rotating objects within the 3D display model around a predefined viewpoint.

5. The method of claim 1, wherein if the cursor overlaps a given window, the given window becomes a selected window and appears opaque while other windows within the 3D display model appear translucent.

6. The method of claim 1, wherein if a command is received to minimize a window, the window minimization operation is illustrated as an animation that moves the window toward a minimized position near a border of the 2D display while reducing the size of the window to its minimized size.

7. The method of claim 1, wherein if a command is received to close a window, the window closing operation is illustrated as an animation that throws the window away by moving the window toward the background of the 3D display model and causing the window to fade away.

8. The method of claim 1, wherein if a command is received to rotate all windows in the 3D display model, the method further comprises rotating all windows in the 3D display model, so that windows are viewed from an oblique angle through the 2D display, whereby the contents of the windows remain visible, while the windows occupy less space in the 2D display and are less likely to overlap each other.

9. The method of claim 8, wherein when a user selects one of the rotated windows, the method further comprises:
   moving the selected window in front of the other windows;
   unrotating the selected window so it faces the user; and
   moving the other windows back to their original positions and orientations.

10. The method of claim 1, wherein the 2D pointing device can include:
   a mouse;
   a track ball;
   a joystick; and
   a glide point.

11. A computer-readable storage medium storing instructions that when executed by a computer cause the computer to perform a method for manipulating a two-dimensional (2D) window within a three-dimensional (3D) display model, the method comprising:
   receiving an input from a 2D pointing device, wherein the input specifies a 2D offset within a 2D display, wherein the 2D display provides a view into the 3D display model;
   using the 2D offset to move a cursor to a position in the 2D display;
   determining if the cursor overlaps a window within the 3D display model by projecting a ray from a predefined viewpoint in the 3D display model through the cursor, which is located in a rectangle representing the 2D display in the 3D display model, toward one or more windows in the 3D display model and determining if the ray intersects a window;
   if the cursor overlaps a window,
      determining a 2D position of the cursor with respect to a 2D coordinate system for the window, and
      communicating the 2D position to an application associated with the window to enable a user of the 2D pointing device to interact with the application; and
   displaying the window as a 3D object; wherein when the window is rotated, a spine located on a side edge of the window becomes visible, wherein the spine contains a title for the same window, and wherein the thickness of the spine is significantly less than the dimension of the window.

12. The computer-readable storage medium of claim 11, wherein determining the 2D position of the cursor with respect to the 2D coordinate system of the window involves:
   determining a 3D position where the ray intersects the window within the 3D display model; and
   transforming the 3D position in the 3D display model into a 2D position with respect to the 2D coordinate system for the window based upon the size, position and orientation of the window within the 3D display model.

13. The computer-readable storage medium of claim 12, wherein the size, position and orientation of the window within the 3D display model are specified by a number of attributes of the window, including:
   a height;
   a width;
   an x-position;
   a y-position;
   a z-position;
   a first rotation around a vertical axis of the window; and
   a second rotation around a horizontal axis of the window.

14. The computer-readable storage medium of claim 11, wherein the method further comprises:
   receiving a second input from the 2D pointing device; and
   in response to the second input, changing a viewing angle for the 3D display model by rotating objects within the 3D display model around a predefined viewpoint.

15. The computer-readable storage medium of claim 11, wherein if the cursor overlaps a given window, the given window becomes a selected window and appears opaque while other windows within the 3D display model appear translucent.

16. The computer-readable storage medium of claim 11, wherein if a command is received to minimize a window, the window minimization operation is illustrated as an animation that moves the window toward a minimized position near a border of the 2D display while reducing the size of the window to its minimized size.

17. The computer-readable storage medium of claim 11, wherein if a command is received to close a window, the window closing operation is illustrated as an animation that throws the window away by moving the window toward the background of the 3D display model and causing the window to fade away.

18. The computer-readable storage medium of claim 11, wherein if a command is received to rotate all windows in the 3D display model, the method further comprises rotating all windows in the 3D display model, so that windows are viewed from an oblique angle, whereby the contents of the windows remain visible, while the windows occupy less space in the 2D display and are less likely to overlap each other.

19. The computer-readable storage medium of claim 18, wherein when a user selects one of the rotated windows, the method further comprises:
   moving the selected window in front of the other windows;
   unrotating the selected window so it faces the user; and
   moving the other windows back to their original positions and orientations.

20. The computer-readable storage medium of claim 11, wherein the 2D pointing device can include:
   a mouse;
   a track ball;
   a joystick; and
   a glide point.

21. An apparatus that manipulates a two-dimensional (2D) window within a three-dimensional (3D) display model, comprising:
   an input mechanism configured to receive an input from a 2D pointing device, wherein the input specifies a 2D offset within a 2D display, wherein the 2D display provides a view into the 3D display model;
   a cursor mechanism configured to use the 2D offset to move a cursor to a position in the 2D display;
   a window manipulation mechanism configured to determine if the cursor overlaps a window within the 3D display model by projecting a ray from a predefined viewpoint in the 3D display model through the cursor, which is located in a rectangle representing the 2D display in the 3D display model, toward one or more windows in the 3D display model and determining if the ray intersects a window;
   wherein if the cursor overlaps a window, the window manipulation mechanism is configured to,
      determine a 2D position of the cursor with respect to a 2D coordinate system for the window, and to
      communicate the 2D position to an application associated with the window to enable a user of the 2D pointing device to interact with the application; and
   a display mechanism configured to display the window as a 3D object; wherein when the window is rotated, a spine located on a side edge of the window becomes visible, wherein the spine contains a title for the same window, and wherein the thickness of the spine is significantly less than the dimension of the window.

22. The apparatus of claim 21, wherein while determining the 2D position of the cursor with respect to the 2D coordinate system of the window, the window manipulation mechanism is configured to:
   determine a 3D position where the ray intersects the window within the 3D display model; and to
   transform the 3D position in the 3D display model into a 2D position with respect to the 2D coordinate system for the window based upon the size, position and orientation of the window within the 3D display model.

23. The apparatus of claim 22, wherein the size, position and orientation of the window within the 3D display model are specified by a number of attributes of the window, including:
   a height;
   a width;
   an x-position;
   a y-position;
   a z-position;
   a first rotation around a vertical axis of the window; and
   a second rotation around a horizontal axis of the window.

24. The apparatus of claim 21, further comprising a viewing angle changing mechanism configured to:
   receive a second input from the 2D pointing device; and
   in response to the second input, to change a viewing angle for the 3D display model by rotating objects within the 3D display model around a predefined viewpoint.

25. The apparatus of claim 21, wherein if the cursor overlaps a given window, the window manipulation mechanism is configured to make the given a selected window that appears opaque while other windows within the 3D display model appear translucent.

26. The apparatus of claim 21, wherein if a command is received to minimize a window, the window manipulation mechanism is configured to illustrate the minimization operation as an animation that moves the window toward a minimized position near a border of the 2D display while reducing the size of the window to its minimized size.

27. The apparatus of claim 21, wherein if a command is received to close a window, the window manipulation mechanism is configured to illustrate the window closing operation as an animation that throws the window away by moving the window toward the background of the 3D display model and causing the window to fade away.

28. The apparatus of claim 21, wherein if a command is received to rotate all windows in the 3D display model, the window manipulation mechanism is configured to rotate all windows in the 3D display model, so that windows are viewed from an oblique angle through the 2D display, whereby the contents of the windows remain visible, while the windows occupy less space in the 2D display and are less likely to overlap each other.

29. The apparatus of claim 28, wherein when a user selects one of the rotated windows, the window manipulation mechanism is configured to:

move the selected window in front of the other windows;

unrotate the selected window so it faces the user; and to move the other windows back to their original positions and orientations.

30. The apparatus of claim 21, wherein the 2D pointing device can include:

a mouse;

a track ball;

a joystick; and a glide point.

31. A means for manipulating a two-dimensional (2D) window within a three-dimensional (3D) display model, comprising:

an input means for receiving an input from a 2D pointing device, wherein the input specifies a 2D offset within a 2D display, wherein the 2D display provides a view into the 3D display model;

a cursor means configured to use the 2D offset to move a cursor to a position in the 2D display;

a window manipulation means configured to determine if the cursor overlaps a window within the 3D display model by projecting a ray from a predefined viewpoint in the 3D display model through the cursor, which is located in a rectangle representing the 2D display in the 3D display model, toward one or more windows in the 3D display model and determining if the ray intersects a window;

wherein if the cursor overlaps a window, the window manipulation means is configured to, determine a 2D position of the cursor with respect to a 2D coordinate system for the window, and to communicate the 2D position to an application associated with the window to enable a user of the 2D pointing device to interact with the application; and a display means for displaying the window as a 3D object;

wherein when the window is rotated, a spine located on a side edge of the window becomes visible, wherein the spine contains a title for the same window, and wherein the thickness of the spine is significantly less than the dimension of the window.

* * * * *